United States Patent [19]

Egawa

[11] Patent Number: 5,138,460
[45] Date of Patent: Aug. 11, 1992

[54] APPARATUS FOR FORMING COMPOSITE IMAGES

[75] Inventor: Akira Egawa, Machida, Japan

[73] Assignee: Canon Kabushiki Kaisha, Tokyo, Japan

[21] Appl. No.: 541,193

[22] Filed: Jun. 22, 1990

Related U.S. Application Data

[63] Continuation of Ser. No. 234,166, Aug. 19, 1988, abandoned.

[30] Foreign Application Priority Data

Aug. 20, 1987 [JP] Japan .................. 62-206697

[51] Int. Cl.⁵ .............................................. H04N 5/30
[52] U.S. Cl. ..................... 358/224; 358/909; 354/94
[58] Field of Search .............. 358/87, 103, 183, 909, 358/906, 335, 224, 22, 226, 209, 182; 354/94, 99, 217; 340/723, 724, 726

[56] References Cited

U.S. PATENT DOCUMENTS

| | | |
|---|---|---|
| 4,011,401 | 3/1977 | Presti ............................ 358/183 |
| 4,400,727 | 8/1983 | Aron ............................ 358/103 |
| 4,456,931 | 6/1984 | Toyoda ......................... 358/909 |
| 4,714,962 | 12/1987 | Levene ......................... 358/909 |
| 4,873,576 | 10/1989 | Hattori et al. ................ 358/224 |
| 4,887,161 | 12/1989 | Watanabe et al. ............ 358/224 |
| 5,023,720 | 6/1991 | Jardins ......................... 358/183 |

FOREIGN PATENT DOCUMENTS 2066973 7/1981 United Kingdom .............. 354/94

*Primary Examiner*—James J. Groody
*Assistant Examiner*—Safet Metjahic
*Attorney, Agent, or Firm*—Fitzpatrick, Cella, Harper & Scinto

[57] ABSTRACT

A panorama photographing device such as a camera has a display device for displaying an image to be photographed such as a portion of an object, a memory device for storing data concerning an image which has been already photographed such as a previously photographed portion of the object, and a control device for enabling the display device to substantially simultaneously display both the image to be photographed and the image already photographed and stored as data in the memory device.

70 Claims, 13 Drawing Sheets

FIG. 5
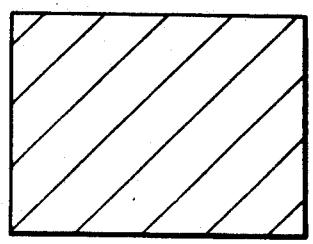
(a)
nTH FRAME
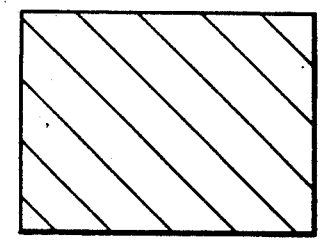
(b)
(n+1)TH FRAME
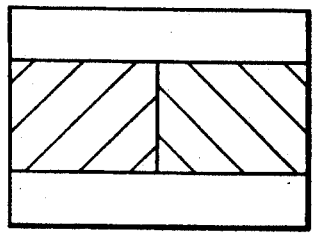
(c)
nTH    (n+1)TH
FRAME  FRAME
FINDER (n+1)TH  nTH
FRAME  FRAME (n+1)TH  nTH
FRAME  FRAME

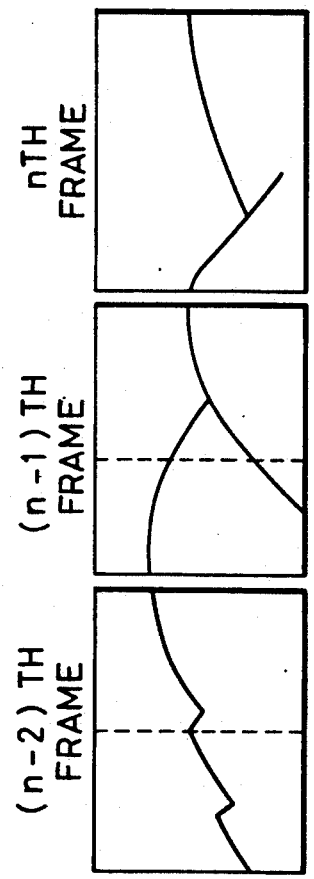
FIG. 10
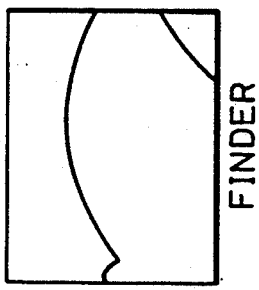
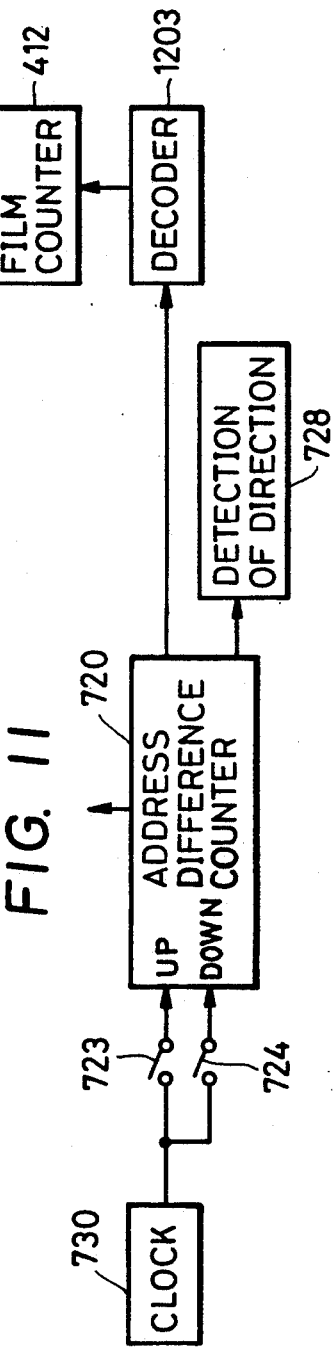
FIG. 11

FIG. 12
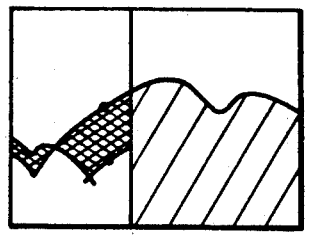
(a)
← nTH FRAME →
← (n+1)TH FRAME →
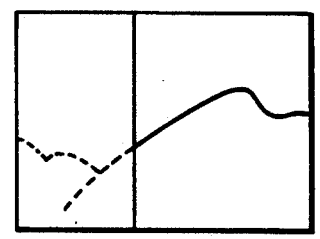
(b)
← nTH FRAME →
← (n+1)TH FRAME →
FIG. 13
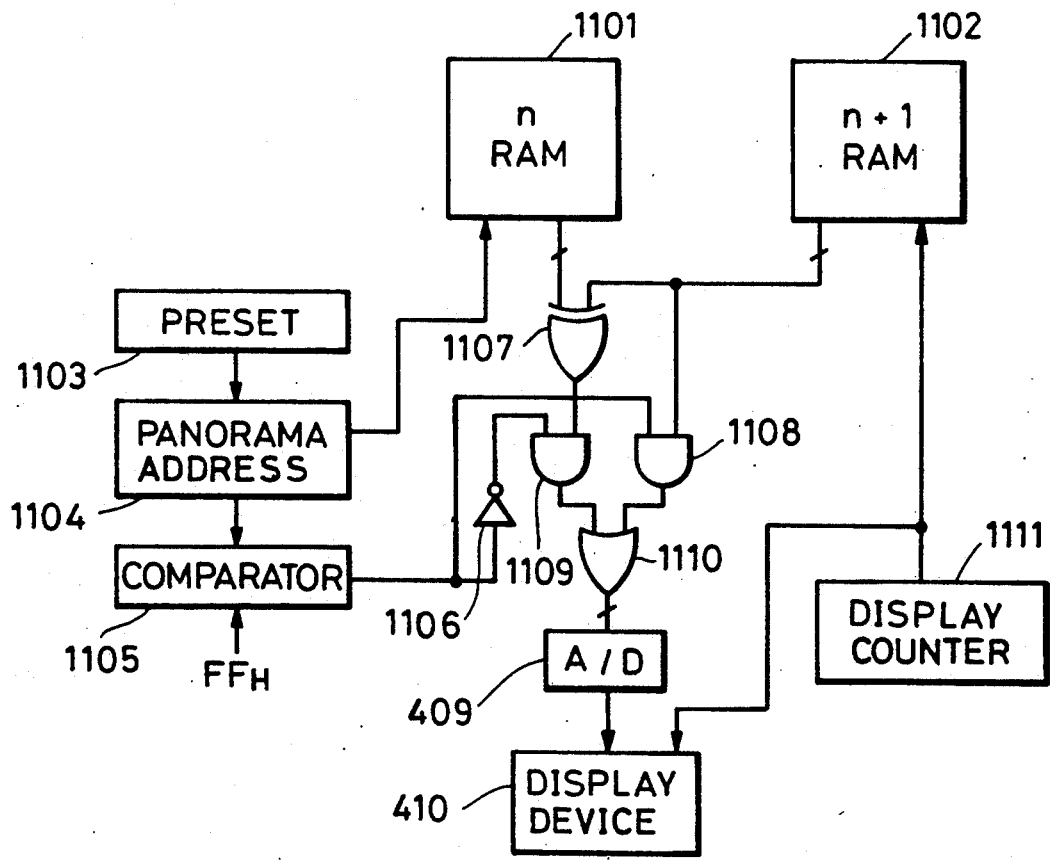

nTH FRAME (n+1)TH FRAME

FINDER (n-2)TH FRAME (n-1)TH FRAME nTH FRAME (n-3)TH FRAME | (n-2)TH FRAME
(n-1)TH FRAME | (n+1)TH FRAME (n-3)TH FRAME | (n-2)TH FRAME

```
A  B  C  D        E  F  G
H  I  J  K        L  M  N

O  P  Q  R        S  T  U
V  W
```

(n-1)TH FRAME | (n+1)TH FRAME

APPARATUS FOR FORMING COMPOSITE IMAGES

This application is a continuation of application Ser. No. 234,166, filed Aug. 19, 1988, now abandoned.

BACKGROUND OF THE INVENTION

1. Field of the Invention

The present invention relates to a panorama photographing device having an electronic viewfinder, such as a camera.

2. Related Background Art

Conventionally, panoramic photography has required a photographer to remember the position of the juncture between adjacent sections of an object or scenery which are to be photographed in successive frames of pictures. It has also been necessary to fix the camera by, for example, a tripod. It is very troublesome to remember the juncture between adjacent object sections. In addition, it is very difficult to smoothly connect the successive shots because the photographer has to compose the panoramic image in such a manner that the juncture which is on one end. e.g., right end, of the picture frame photographed has to be located on the other end, e.g., left end, of the picture frame in the next shot. This problem is serious particularly when the object to be photographed is a monotonous one having no particular characteristic as in the case of a landscape. In such a case, the photographer encounters difficulty in smoothly connecting the successive images If the photographer has forgotten the position of the juncture, he has to repeat the photographing from the beginning, i.e., from the first object section. In some cases, panoramic photography requires the photographer to connect images not only in the horizontal direction but also in the vertical direction. It is not easy to obtain a smooth connection of images both horizontally and vertically without the aid of a tripod. Namely, panoramic photography may fail even with a slight change in the position of the camera held by the photographer.

SUMMARY OF THE INVENTION

Accordingly, an object of the present invention is to provide a panorama photographing device improved in such a way as to obviate these problems of the prior art.

To this end, according to the present invention, there is provided a panorama photographing device comprising: display means for displaying an image to be photographed; memory means for storing data concerning an image which has been already photographed; and control means for enabling the display means to display, substantially simultaneously, both the image to be photographed and the image already photographed and stored in the memory means.

With this arrangement, the image which has been already photographed and the image which is to be photographed subsequently are simultaneously displayed so as to enable the photographer to smoothly connect both images thereby ensuring high quality of the panorama photograph.

In a further aspect of the invention, there is provided display means, imaging means, memory means and control means. The display means is arranged to display an image of an object. The imaging means generates image signals corresponding to the object. The memory means stores the image signals generated by the imaging means. The control means causes the display means to simultaneously display (1) at least a portion of the image which corresponds to the stored image signals, and (2) at least a portion of a subsequent image.

In yet a further aspect of the present invention, there is provided imaging means, memory means, display means, and control means. The imaging means converts a first image into an image signal. The memory means stores the image signals, and the display means displays a second image which is substantially a real-time image. The control means causes the display means to simultaneously display (1) at least a portion of the first image, that portion derived from the image signal stored in the memory means, and (2) the second image.

The above and other objects, features and advantages of the present invention will become clear from the following description of the preferred embodiments when read in conjunction with the accompanying drawings.

BRIEF DESCRIPTION OF THE DRAWINGS

FIGS. 5(a), 5(b) and 5(c) are illustrations of a second example of the display on the camera shown in FIG. 1;

FIG. 10 is an illustration of a fifth example of the display on the camera shown in FIG. 1;

FIG. 11 is a circuit diagram of a circuit for forming the image on display as shown in FIG. 10;

FIGS. 12(a) and 12(b) are illustrations of a sixth example of the display on the camera shown in FIG. 1;

FIG. 13 is an illustration of a circuit for forming the image on display as shown in FIG. 12;

DESCRIPTION OF THE PREFERRED EMBODIMENTS

Figure 1:
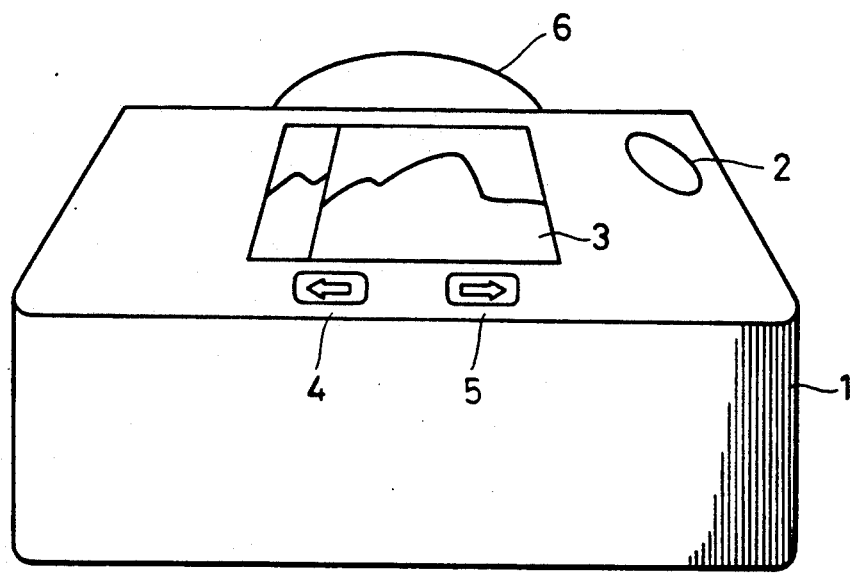
FIG. 1 is a perspective view of a camera.

FIG. 1 shows a camera incorporating a panorama photographing device in accordance with the present invention. In the following description, the same reference numerals are used to denote the same parts or elements. The camera shown in FIG. 1 has a camera body 1, a release button 2, a display device 3, a left scroll switch button 4, a right scroll switch button 5, and a lens 6 for focusing an image on a photographic film or on an imaging device.

Figure 2:
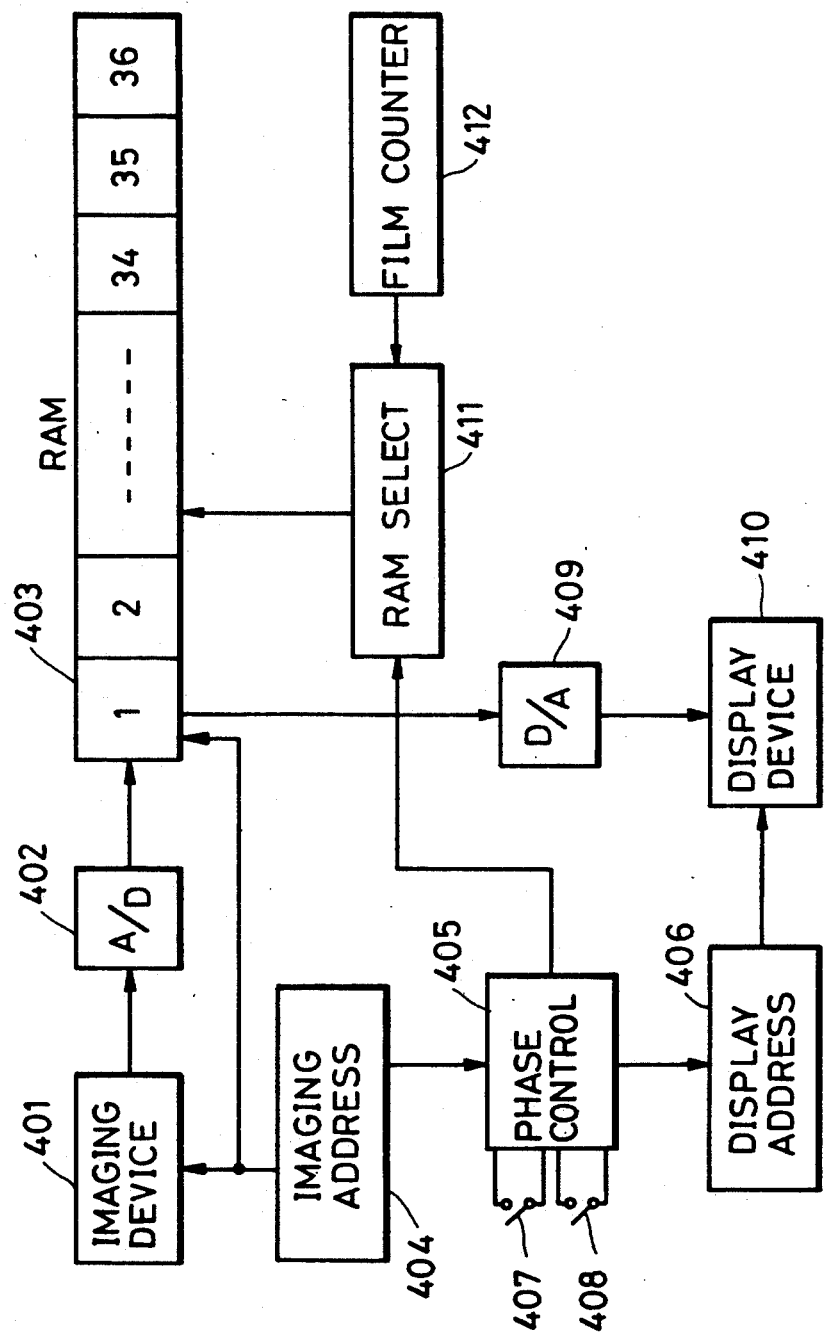
FIG. 2 is a circuit diagram of a principal circuit incorporated in the camera shown in FIG. 1.

FIG. 2 illustrates an example of a circuit incorporated in the camera. The circuit has an imaging address generating device 404 which generates and then superimposes electrical signals, in the form of image addresses, on the image signal imaged by the imaging device 401. The image signals are converted into digital signals by an A/D (Analog-to-Digital) converter 402 and these digital signals are stored in RAMs (Random Access Memory) 403. There are 36 RAMs, RAM1 to RAM36 which are adapted to be selected by a RAM selecting device 411 in accordance with information given by a film counter 412.

The image signals stored in the RAMs 403 are delivered to D/A (Digital to Analog) converter 409 and the analog signals output from the D/A converter 409 are displayed at a position on display device 410 designated by the address generated by the display address generating device 406. A phase control device 405 operates to provide a phase difference between the displayed address and the imaging address so that the display device 410 displays the image as if the start address has been materially changed, as will be explained later in connection with FIG. 4. The phase control device 405 delivers a signal to the RAM select device 411 to enable the display device 410 to display the data in the next or adjacent RAM 403 in accordance with the address information as will be explained later, whereby display images as shown in FIGS. 3(a) and 3(b) are obtained.

Figure 3A:
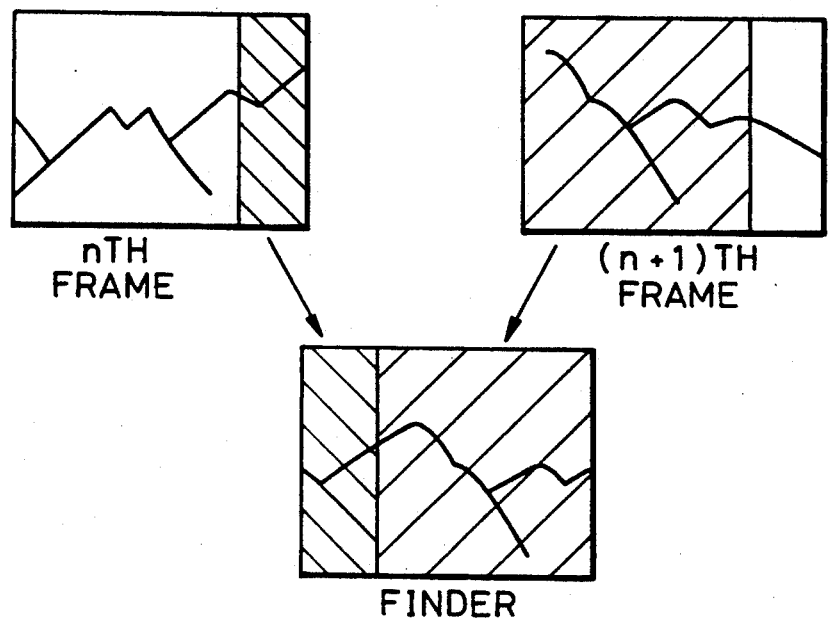
FIGS. 3(a) and 3(b) are illustrations of a first example of a display on the camera shown in FIG. 1.
Figure 3B:
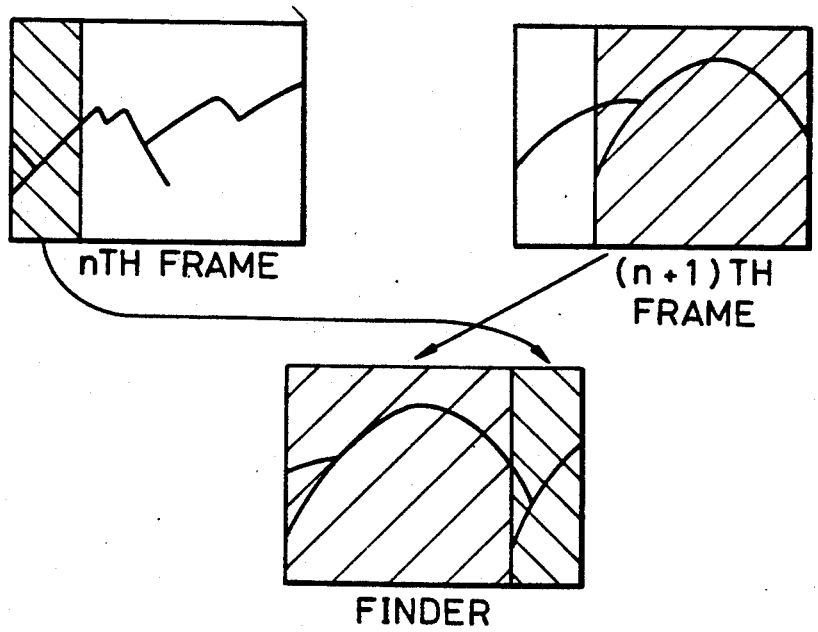
Figure 4:
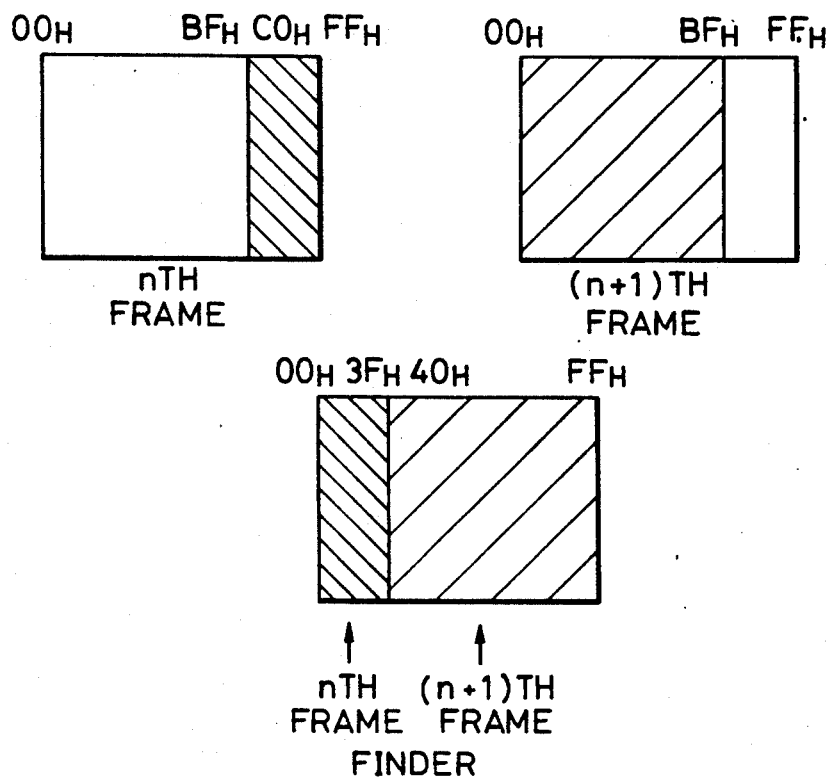
FIGS. 4(a) and 4(b) are illustrations of horizontal addresses of successive images corresponding to FIGS. 3(a) and 3(b)
Figure 4:
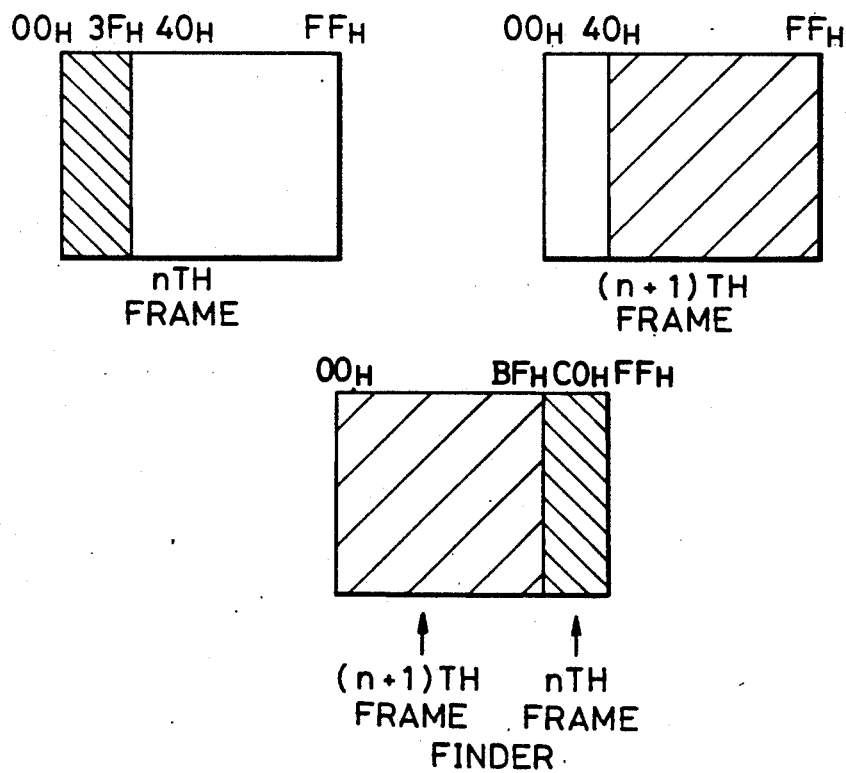

The switches 407 and 408 shown in FIG. 2 are selection switches which enable the photographer to select either a rightward panorama mode or a leftward panorama mode, whereby a display image as shown in FIG. 3(a) or a display image as shown in FIG. 3(b) is obtained.

FIGS. 3(a) and 3(b) illustrate an example of the display obtained in the camera shown in FIGS. 1 and 2. The display as shown in FIG. 3(a) is obtained when the rightward panorama mode has been selected through the manipulation of the switch 407. In this case, only the hatched area of the n-TH picture frame showing the previously photographed image is shown at the left end of the frame now appearing in the viewfinder, whereas the image to be photographed next, i.e., the object section to be photographed on the (n+1)TH picture frame is dynamically displayed on the right portion of the frame now appearing in the viewfinder. The photographer therefore can precisely join the image on the n-TH picture frame and the image on the (n+1)TH frame at the expected juncture. Although the rightward panorama mode has been described, the user can equally select the leftward mode in which the camera is swung from right to left, by operating the leftward panorama switch 408. In such a case, the hatched left end portion of the picture on the n-TH frame is displayed on the right end of the frame now appearing in the viewfinder, while the hatched area of the (n+1)TH frame is displayed on the left end of the viewfinder, whereby panoramic photographing of the image is possible by swinging the camera from the right to the left.

FIGS. 4(a) and 4(b) show the horizontal addresses of the n-TH and (n+1)TH images displayed in the viewfinder, corresponding to the display images shown in FIGS. 3(a) and 3(b), respectively.

Referring first to FIG. 4(a), it is assumed here that a single image has horizontal addresses extending from $00_H$ to $FF_H$. In such a case, the display as shown in FIG. 3(a) can be obtained by displaying, in the address region $00_H$ to $3F_H$ on the viewfinder, the image of the n-TH frame addressed between $C0_H$ to $FF_H$, while displaying the portion of the image of the (n+1)TH frame between the addresses $00_H$ to $BF_H$ on the region of the viewfinder addressed between $40_H$ and $FF_H$. The display as shown in FIG. 3(b) can be obtained in a similar manner by making use of the address information as shown in FIG. 4(b).

From these facts, it is understood that the display as shown in FIGS. 3(a) and 3(b) can be obtained by suitably shifting the address information.

FIGS. 5(a), 5(b), and 5(c) illustrate a second example of the display. In this case, entire portions of two adjacent images are displayed in a side-by-side relation on a frame in the viewfinder. More specifically, in this example, data are read from alternating RAMs 403 both in the vertical and horizontal directions by the operation of the address generating device 404 in the circuit of FIG. 2, and the phase shift device 405 and the RAM select device 411 are suitably operated such that the start addresses for the n-TH frame and the (n+1)TH frame are set in a manner corresponding to the display shown in FIGS. 5(a), 5(b) and 5(c) causing the display address generating device 406 to designate the vertical range of the display address.

Figure 6:
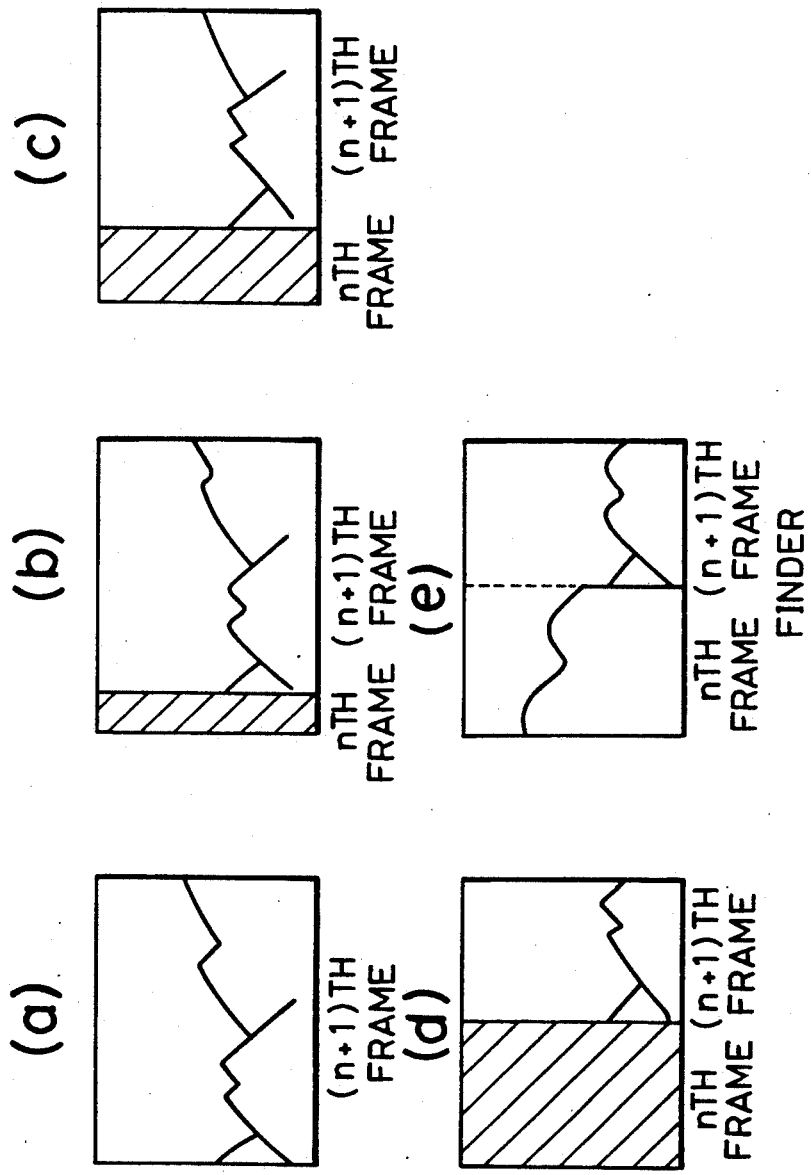
FIGS. 6(a), 6(b) and 6(c) are illustrations of a third example of the display on the camera shown in FIG. 1.

FIGS. 6(a) to 6(c) illustrate a third example of the display. In contrast to the display of FIGS. 3(a) and 3(b) in which the phase difference is fixed, the example shown in FIGS. 6(a), 6(b) and 6(c) enables the size or area of display of the image of the preceding picture frame to be varied by scrolling the images progressively from the state of FIG. 6(a) to the state of FIG. 6(b) and then to the state of FIG. 6(c) by means of the buttons 4 and 5 shown in FIG. 1. Thus, the image to be photographed in the next frame, i.e., (n+1)TH frame, is dynamically displayed on the right portion of the area in the viewfinder, whereas the static image which has been photographed in the preceding frame, i.e., n-TH frame, is shown on the left portion of the area in the viewfinder.

Figure 7:
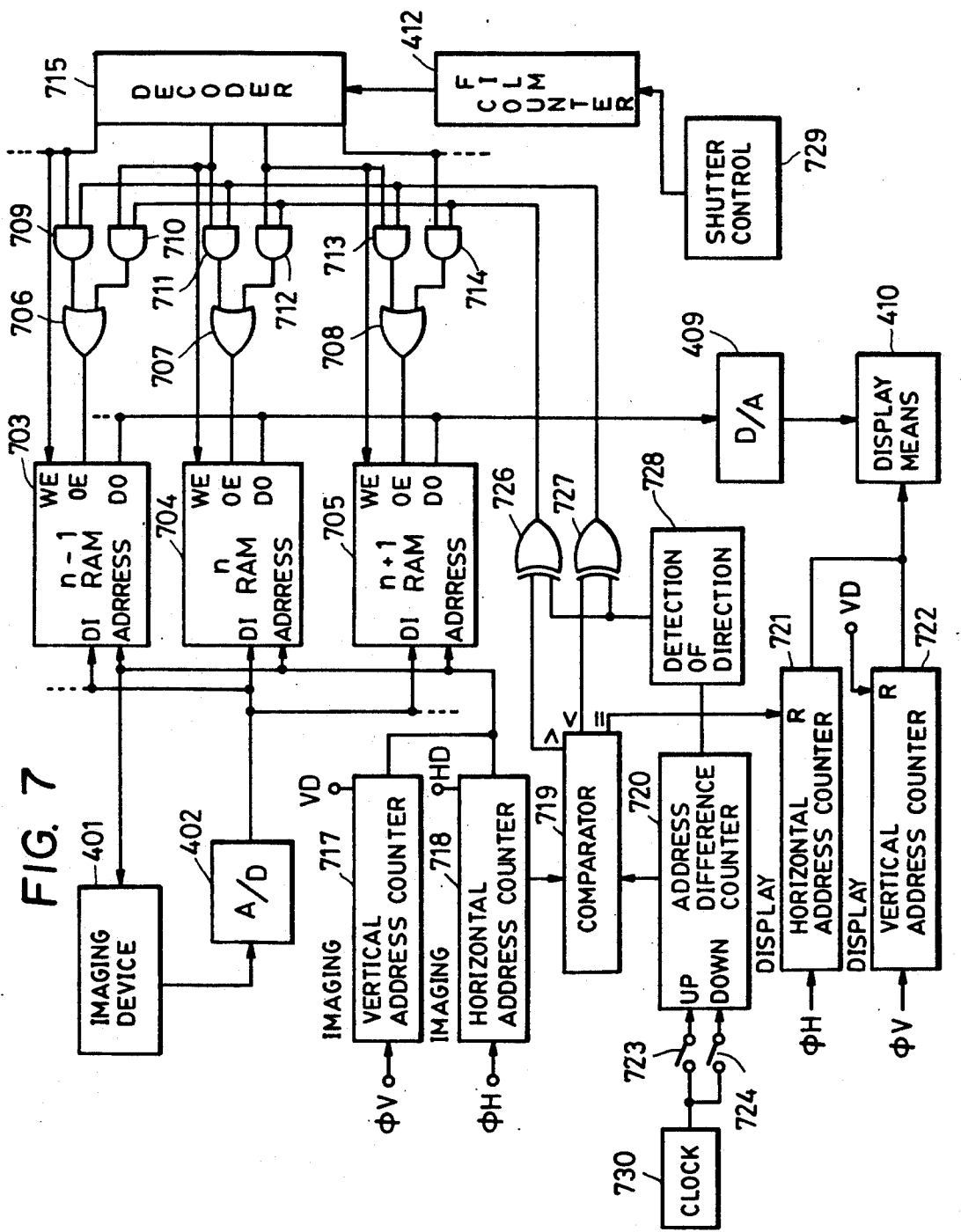
FIG. 7 is a circuit diagram of a circuit for forming the image on display as shown in FIG. 6.

The display as shown in FIGS. 6(a) to 6(c) can be realized by, for example, a circuit which will be described hereinunder with reference to FIG. 7.

The object image is converted into image signals by the imaging device 401 which are processed by the A/D converter 402 to become digital signals. These digital signals are input to the DI terminals of the RAMs 703 to 705. RAMs 703 to 705 comprise the RAM 403 explained before. Actually, there are many RAMs corresponding in number to the number of the frames of the photographic film, although only some of them are shown. The vertical transfer clock pulses $\phi V$ for the imaging device 401 are counted by a vertical address counter 717 so as to transfer the vertical addresses to the imaging device 401 and to the RAMs 703 to 705. The counter 717 is adapted to be reset by a vertical blanking signal VD when a predetermined number of transfer clock pulses oV have been counted. Similarly, the horizontal transfer clock pulses oH for the imaging device 401 are counted by a horizontal address counter 718 so as to transfer the horizontal addresses to the imaging device 401 and to the RAMs 703 to 705. The counter 717 is adapted to be reset by a horizontal blanking signal HD when a predetermined number of transfer clock pulses oH have been counted.

The film counter 412 delivers a signal representing the number of frames of the photographic film. In response to this signal, the decoder 715 delivers a signal to the WE terminals of the RAMs 703 to 705 so that one of the RAMs 703 to 705 is selected into which the image signals from the imaging device are delivered. The content of the film counter 412 is incremented by one in response to the exposure timing signal delivered by a shutter control device 729 so that the output of the decoder 715 is switched, whereby the image data is recorded in the form of a still image in the RAM which was selected by the decoder 715. The present image data are successively delivered to the D/A converter 409 through the RAMs so as to be converted into analog signals and are dynamically displayed on the display device 410 as the present image.

The RAM from which the data is to be read is selected by inputting a signal to the OE terminal of the RAM to be selected from a select gate comprised of AND gates 709 to 714 and OR gates 706 to 708 in response to the outputs from the decoder 715 and the exclusive OR gates 726, 727 which will be explained later.

The switches 723 and 724 are adapted to be operated in response to the pressing of the buttons 4 and 5 shown in FIG. 1. These switches, when turned on, enable a clock generating device 730 to deliver a clock signal to UP and DOWN counters of an address difference counter 720 so that the counter 720 conducts up-counting and down-counting, respectively. The value counted by the address difference counter is used as the amount of scroll, i.e., the value of offset of the juncture between the image on the n-th frame and the image on the (n+1)th frame. A direction detecting device 728 detects the direction of the scroll so as to determine whether the image of the n-th frame is to be displayed on the right side or the left side of the display area of the display device 410.

A comparator 719 compares the content of the imaging horizontal address counter 718 and the content of the address difference counter 720. The results of the comparison are delivered to exclusive OR circuits 726 and 727, respectively. The value counted by the address difference counter 720 is thus compared with the content of the imaging horizontal address counter 718. When the output from the direction detecting device 728 indicates that rightward scrolling is being conducted, the exclusive OR gate 726 provides an output "H" while the exclusive OR circuit 727 provides an output of "L" level, as long as the content of the imaging horizontal address counter 718 is greater than the value counted by the address difference counter 720. If the content of the film counter 412 is (n+1) in this state, the AND gate 712 is selected in accordance with the output from the decoder 715, so that the image data on the n-TH frame is read from the RAM 704 and is delivered to the display device 410 through the D/A converter 409. The display device 410 performs the displaying operation in accordance with the addresses designated by the display horizontal address counter 721 and the display vertical address counter 722. The display horizontal address counter 721 is reset at the moment of the coincidence signal (=) is from the comparator 719.

Thereafter, the content of the imaging horizontal address counter 718 becomes greater than the count value of the address difference counter 720 and the image data in the RAM 704 corresponding to the addresses in the imaging horizontal address counter in this state, i.e., the right portion of the image on the n-TH frame, is displayed on the left portion of the display area on the display device 410. Thereafter, the imaging horizontal address counter 718 is reset to the initial state by the horizontal blanking signal HD and the content of the imaging horizontal address counter 718 becomes smaller than the value counted by the address difference counter 720. As a result, the exclusive OR gates 726 and 727 output "L" and "H" signal, respectively, in accordance with the output of the comparator 719, so that the AND gate 713 is selected and the image data on the present frame, i.e., on the (n+1)TH frame is read from the RAM 705 and input to the display device 410 through the D/A converter 409.

In consequence, the display device 410 displays images in such a manner that the image data corresponding to the first address in the imaging horizontal address counter 718 is displayed at the position which corresponds to the address designated by the display horizontal address counter 721 at this moment. In consequence, a left end portion of the image on the (n+1)TH frame is displayed on the right side of the n-TH frame in contact with the latter as shown in FIG. 6(b).

In case of a leftward scroll, the output of the direction detecting means 728 is inverted so that the condition of switching of the outputs from the exclusive OR gates 726 and 727 is reversed from that in the rightward scroll. In consequence, a right end portion of the image on the (n+1)TH frame is displayed on the left portion of the display area of the display device 410, while the left end portion of the image on the n-TH frame is displayed on the right side of the display area on the display device 410.

The imaging address generating device 404 used in the circuit shown in FIG. 2 can be obtained by combining the imaging vertical address counter 717 and the imaging horizontal address counter 718 of this embodiment. At the same time, the phase control device 405 of the circuit shown in FIG. 2 may comprise the address difference counter 720 with fixed up-count and down-count values, direction detecting device 728, comparator 719 and the exclusive OR gates 726 and 727, all of which are used in this embodiment. In addition, the RAM select device 411 used in the circuit of FIG. 2 may comprise the combination of OR gates 706 to 708, AND gates 709 to 714 and the decoder 715. Finally, the address generating device 406 of the circuit shown in FIG. 2 may comprise a combination of the display horizontal address counter 721 and the display vertical address counter 722 of this embodiment.

Figure 8:
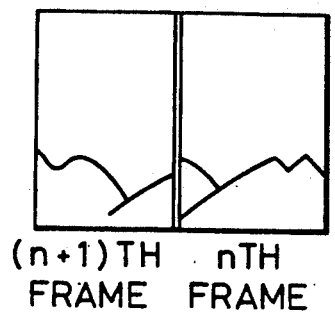
FIGS. 8(a) and 8(b) are illustrations of a fourth example of the display on the camera shown in FIG. 1.
Figure 8:
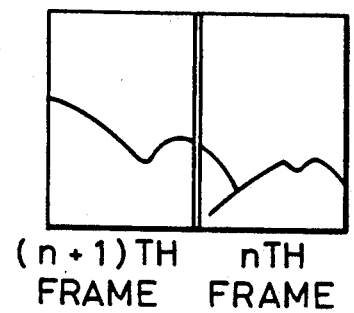

FIGS. 8(a) and 8(b) illustrate a fourth example of the display, in which a border line is drawn between both images so as to facilitate the discrimination between two images. The border line enables the photographer to easily find the position of the juncture between two images even when these two images are substantially continuous as shown in FIG. 8(b).

Figure 9:
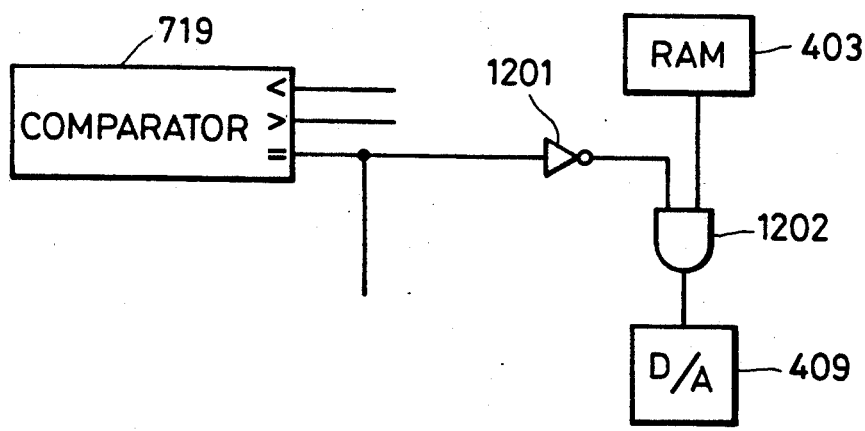
FIG. 9 is a circuit diagram of a circuit for forming the image on display as shown in FIG. 8.

A method for obtaining this type of display will be explained with reference to FIG. 9. The coincidence signal (=) from the comparator 719 is inverted by an inverter 1201 and the inverted signal is input to one of the inputs of an AND gate 1202, while the other input receives the data from the RAM 403. The output from the AND gate 1202 is delivered to the D/A converter 409. In consequence, when the coincidence signal is output from the comparator 719, the AND gate 1202 inhibits the delivery of the data of the RAM 403 to the D/A converter 409 and the inhibited portion of the data is displayed as the border line shown in FIG. 8.

FIG. 11 illustrates an improvement in the scroll function explained in connection with FIG. 7. In this case, the address difference counter 720, which is the same as that shown in FIG. 7, is controlled by a decoder 1203 such that it counts down or up frame numbers when the scroll has proceeded beyond the preceding frame or the subsequent frame and delivers the counted value to the decoder 715 thus enabling scrolling of the film over a multiplicity of frames. Namely, with reference to FIG. 10, after conducting panorama photographing on the (n−2)TH frame, (n−1)TH frame and the n-TH frame, the display region A is shifted to the left and right in response to the manipulation of the scroll buttons, thereby displaying the desired image on the viewfinder. This arrangement enables the photographer to confirm the state of the panorama photograph in the electronic viewfinder after a series of shots.

FIGS. 12(a) and 12(b) illustrate a sixth example of the display in which a portion of the image in the preceding frame, i.e., n-TH frame, is left on the display and the image in the next frame, i.e., the (n+1)TH frame is superposed on the left image of the preceding frame. More specifically, FIG. 12(a) shows the state in which the duplicate portions do not correctly overlap each other, while FIG. 12(b) shows the state in which the duplicate portions precisely overlap each other so that the image of the preceding frame has become invisible. It may seem that this measure is not preferred because the prints of the photographed image contain overlapping portions. This problem, however, can be overcome by designing the imaging device such that it can form an image portion out of the area to be printed. It will be understood that this example enables the photographer to check at a glance whether the successive images are continuous or not, thus facilitating the connection of images on successive frames.

FIG. 13 shows a circuit which is capable of forming the display images explained in connection with FIGS. 12(a) and 12(b).

The address data in a display address counter 1111 is delivered to a RAM 1102 which picks up the present image, i.e., the image on the (n+1)TH frame, and also to the display device 410, so that the data from a RAM 1102 is displayed on the display device 410 at the same address as that in the RAM 1102. A RAM 1101 is adapted for picking up the data of an image on the preceding frame, i.e., the n-TH frame. The address offset value is set in a panorama address generating device 1104 by a pre-set device 1103 and the RAM 1101 reads the data in accordance with this offset value. The data from the RAM 1102 and the data from the RAM 1101 are input to the exclusive OR gate 1107 and, when coincidence between these data is obtained, the exclusive OR gate delivers an output of "L" level. Thus, the exclusive OR gate 1107 outputs the overlapping portion between the image data from the RAMs 1101 and 1102. On the other hand, the comparator 1105 compares the value counted by the panorama address generating device 1104 with the content of the display address counter 1111. The comparator 1105 delivers an output of "H" level when the image data from the RAM 1101 has been scrolled to the right end of the display area, i.e., to the address $FF_H$. Before such a condition is obtained, the AND gate 1109 receives a signal of "H" level through the inverter 1106 so that the output of the exclusive OR gate 1107 is delivered to the A/D converter 409 through the AND gate 1109 and the OR gate 1110, so that a display as shown in FIG. 12(a) is formed on the left portion of the display area of the display means 410. When the image data from the RAM 1101 has been moved to the right end, i.e., to the address $FF_H$ as described above, the output from the comparator 1105 is inverted so that the OR gate 1110 receives through the AND gate 1108 only the output of the RAM 1102, whereby a display as shown in FIG. 12(b) is formed on the right portion of the display area in the display means 410.

Figure 14:
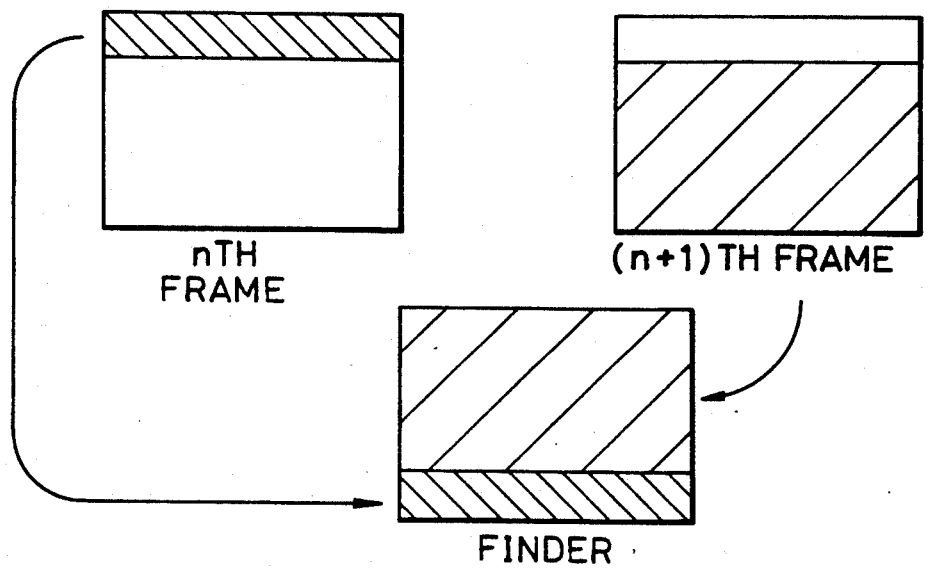
FIG. 14 is an illustration of a seventh example of the display on the camera shown in FIG. 1.

FIG. 14 illustrates a manner in which the panorama picture is scrolled or developed in vertical directions. This can be realized by applying the control of the horizontal address counter in the described embodiment to the vertical address counter.

Figure 15:
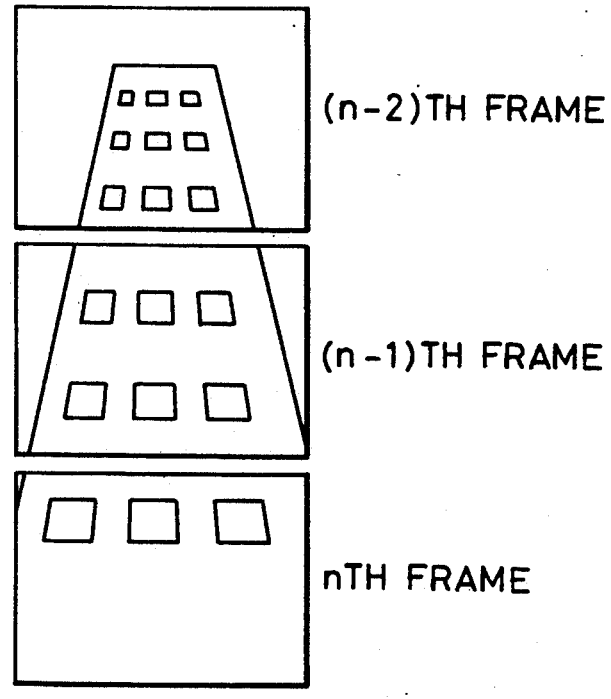
FIG. 15 is an illustration of an eighth example of the display on the camera shown in FIG. 1.

FIG. 15 shows the manner of scrolling shown in FIG. 10 developed in the vertical direction. This also can be realized by applying the control of the horizontal address counter in the circuits of FIGS. 7 and 11 to the vertical address counter.

Figure 16:
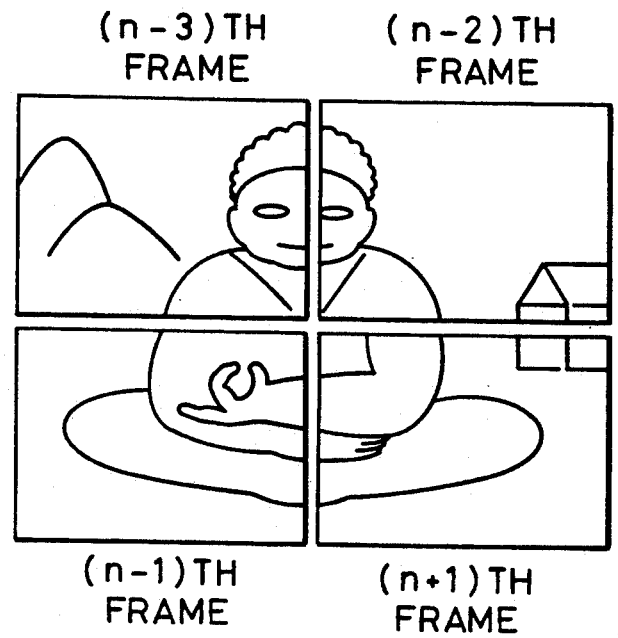
FIG. 16 is an illustration of a ninth example of the display on the camera shown in FIG. 1.

FIG. 16 illustrates a manner in which the images are scrolled both up and down and to the left and right. It will be clear to those skilled in the art that such a four-way scroll can be easily attained by suitably combining the arrangements described hereinbefore. This arrangement enables an object to be photographed in perspective view as shown in FIG. 16.

Figure 17:
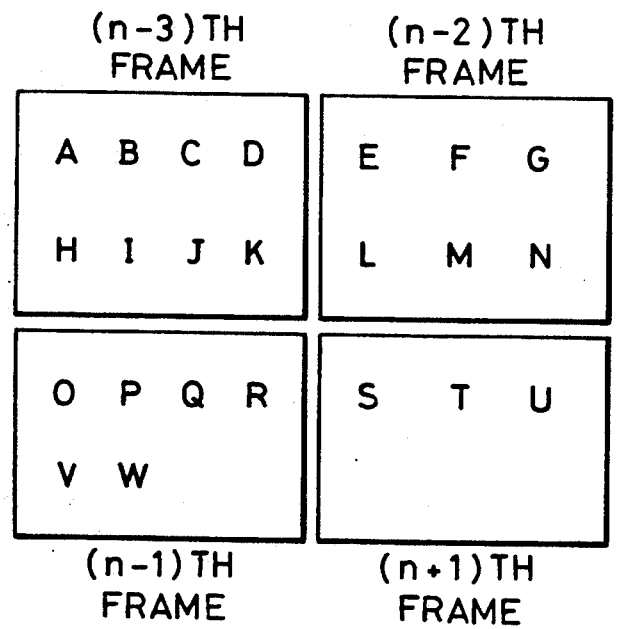
FIG. 17 is an illustration of a tenth example of the display on the camera shown in FIG. 1.

FIG. 17 illustrates a modification of the example of FIG. 16 designed for reading characters or letters. The number of letters which can be displayed on and recognized through a single picture frame is limited by the number of pixels in the imaging device 401 or the display device 410 of FIG. 7. For storing voluminous textual information in a written document, therefore, it is necessary to divide the written document into a plurality of sections and to record them in frames which are successive both vertically and horizontally. The panorama photographing device of the invention makes it possible to easily recognize the juncture between the images on the adjacent frames. By storing these image data in a memory and suitably controlling the memory by, for example, a microcomputer, the sections of the object which is in this case a written document are automatically and visually connected to enable the user to read through the content of the document.

Figure 18:
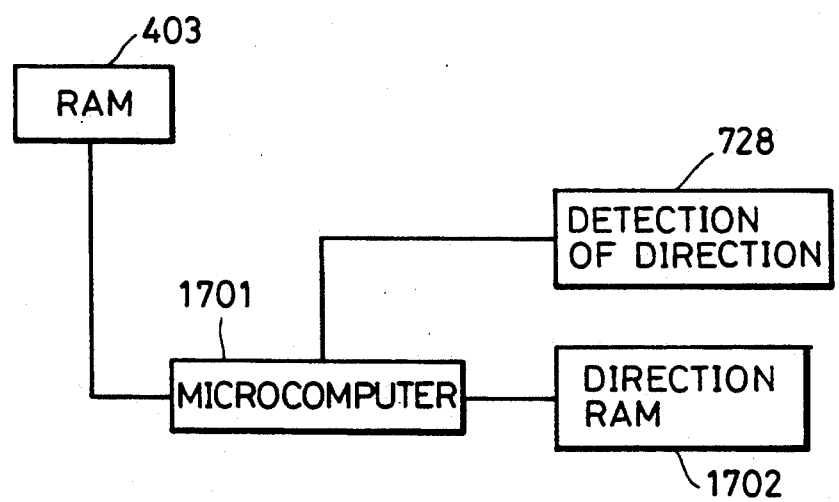
FIG. 18 is an illustration of another circuit which incorporates a microcomputer.

FIG. 18 shows a different embodiment which incorporates a microcomputer. The microcomputer 1701 fetches information concerning the direction of panorama photographing from a direction detecting device 728 and stores the information in a direction RAM 1702. In reproducing the panorama image, the microcomputer delivers address data to the RAM 403 in accordance with the data from the direction RAM 1702 in accordance with the scrolling operation.

The specific structural details of the devices represented by blocks in the schematic diagrams of FIGS. 2, 7, 9, 11, 13 and 18 are per se well known or could be readily constructed by the person of ordinary skill in this field without undue experimentation. Therefore, the exact structure of the blocks in the schematics is not described in further detail in order to more clearly describe the present invention, and since such details are not critical to the best mode of carrying out the present invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus having a display device for a camera, said apparatus comprising:
   (A) display means for displaying a first image corresponding to an image to be photographed;
   (B) memory means for storing data representing at least a second image which has been already photographed; and
   (C) control means for enabling said display means substantially simultaneously display both the first and second images in such a manner that a resulting combined image is substantially continuous at a junction formed between the first and second images.

2. The apparatus according to claim 1, wherein said control means comprises shifting means for shifting the junction.

3. The apparatus according to claim 2, wherein said display means comprises a picture frame, and said shifting means comprises right shifting means for shifting the junction to a position which is right of a centerline of said picture frame.

4. The apparatus according to claim 2, wherein said display means comprises a picture frame, and said shifting means comprises right shifting means for shifting the junction to a position which is right of a centerline of said picture frame.

5. The apparatus according to claim 2, wherein said shifting means comprises operation means for operating said shifting means.

6. The apparatus according to claim 1, further comprising additional memory means for storing data representing the first image, said control means comprising means for reading out the stored data to enable said display means to display the first image.

7. The apparatus according to claim 6, wherein said control means comprises shifting means for shifting the junction by means of reading out the data stored in said memory means and in said additional memory means according to an address of said memory means and an address of said additional memory means.

8. The apparatus according to claim 1, wherein said control means comprises right panorama means for enabling said display means to display the first and second images so as to form a panorama display in the rightward direction.

9. The apparatus according to claim 8, wherein said display means comprises a picture frame, and wherein said control means comprises setting means for setting the junction at a position which is right of a centerline of said picture frame.

10. The apparatus according to claim 1, wherein said control means comprises left panorama means for enabling said display means to display the first and second images so as to form a panorama display in the leftward direction.

11. The apparatus according to claim 10, wherein said display means comprises a picture frame, and wherein said control means comprises setting means for setting the junction at a position which is left of a centerline of said picture frame.

12. The apparatus according to claim 1, wherein said control means comprises means for enabling said display means to display the first and second images so as to form a panorama display.

13. The apparatus according to claim 12, wherein said display means comprises a picture frame, and wherein said control means comprises setting mean for setting the junction at a predetermined position of said picture frame.

14. The apparatus according to claim 12, wherein said control means comprises shifting means for shifting the junction in said display means.

15. The apparatus or a device according to claim 14, wherein said display means comprises a picture frame, and said shifting means comprises right shifting means for shifting the junction to a position which is right of a centerline of said picture frame.

16. The apparatus according to claim 14, wherein said display means comprises a picture frame, and said shifting means comprises right shifting means for shifting the junction to a position which is left of a centerline of said picture frame.

17. The apparatus according to claim 12, wherein said control means comprises means for enabling said display means to display the first and second images by scrolling.

18. The apparatus according to claim 17, wherein said control means comprises means for enabling said display means to stop scrolling and to display the first and second images as a stationary image.

19. The apparatus according to claim 17, wherein said control means comprises means for enabling said display means to display the first and second images as a stationary image.

20. The apparatus according to claim 12, wherein said control means comprises means for enabling said display means to display the junction in the form of a borderline.

21. The apparatus according to claim 12, wherein said control means comprise means for enabling said display means to display at least two previously photographed images and stored in said memory means as data in such a manner that the resulting combined image is substantially continuous at a junction formed between the at least two previously photographed images.

22. The apparatus according to claim 12, wherein said control means comprises means for enabling said display means to display the first and second images in a partially overlapped state.

23. The apparatus according to claim 22, wherein said control means comprises means for enabling said display means to change the display according to whether the partially overlapped state is stored.

24. The apparatus according to claim 12, wherein said control means comprises shifting means for shifting the junction in a lateral direction.

25. The apparatus according to claim 12, wherein said control means comprises means for enabling said display means to display only the second image.

26. The apparatus according to claim 1, wherein said control means comprises means for enabling said display means to display the first and second images so as to form a lateral panorama display.

27. The apparatus according to claim 1, wherein said control means comprises means for enabling said display means to display the first and second images so as to form a longitudinal panorama display.

28. The apparatus according to claim 1, wherein said display means comprises a picture frame, and said control means comprises setting means for setting the junction at a predetermined position of said picture frame.

29. The apparatus according to claim 1, wherein said control means comprises means for enabling said display means to display the first and second images by scrolling.

30. The apparatus according to claim 29, wherein said control means comprises means for enabling said display means to stop scrolling and to display the first and second images as a stationary image.

31. The apparatus according to claim 1, wherein said control means comprises means for enabling said display means to display the first and second images as a stationary image.

32. The apparatus according to claim 1, wherein said control means comprises means for enabling said display means to display the junction in the form of a borderline.

33. An apparatus having a display device according to claim 1, wherein said control means comprises means for enabling said display means to display at least two previously photographed images in combination as the first image and stored in said memory means as data in such a manner that the resulting combined image is substantially continuous at said junction formed therefrom.

34. The apparatus according to claim 1, wherein said control means comprises means for enabling said display means to display the first and second images in a partially overlapped state.

35. The apparatus according to claim 34, wherein said control means comprises means for enabling said display means to change the display according to whether the partially overlapped state is stored.

36. The apparatus according to claim 1, wherein said control means comprises shifting mean for shifting the junction in a lateral direction.

37. The apparatus according to claim 1, wherein said control means comprises means for enabling said display means to display only the first image.

38. An apparatus having a display device for a camera, said apparatus comprising:
(A) display means for displaying a first image to be photographed;
(B) memory means for storing data representing a second image which has been already photographed; and
(C) control means for enabling said display mean to substantially simultaneously display both the first and second images in such a manner that a resulting combined image is substantially continuous at a junction formed between the first and second images, said control means being capable of shifting the junction.

39. The apparatus according to clam 28, wherein said control means comprises shifting means for shifting the junction.

40. The apparatus according to claim 39, wherein said display means comprises a picture frame, and said shifting means comprises left shifting means for shifting the junction to a position which is left of a centerline of said picture frame.

41. The apparatus according to claim 38, wherein said control means comprises operation means for operating said control means.

42. The apparatus according to claim 38, wherein said control means comprises shifting means for shifting the junction in a lateral direction.

43. The apparatus according to claim 38, wherein said control means comprises means for enabling said display means to display the first and second images so as to form a lateral panorama display.

44. The apparatus according to claim 38, wherein said control means comprises means for enabling said display means to display the first and second images so as to form a longitudinal panorama display.

45. An apparatus having a display device for a camera, said apparatus comprising:
(A) display means for displaying a first image to be photographed;
(B) memory means for storing data representing a second image which has been already photographed; and
(C) control means for enabling said display means to substantially simultaneously display both the first and second images in such a manner that a resulting combined image is substantially continuous at a junction formed between the first and second images in such a manner to form a panorama display.

46. An apparatus according to claim 45, wherein said control means comprises control means for shifting the junction.

47. The apparatus according to claim 46, wherein said display means comprises a picture frame, and said control means comprises right control means for controlling the junction to a position which is right of a centerline of said picture frame.

48. The apparatus according to claim 46, wherein said display means comprises a picture frame, and said control means comprises right control means for controlling the junction to a position which is left of a centerline of said picture frame.

49. The apparatus according to claim 46, wherein said control means comprises operation means for operating said control means.

50. The apparatus according to claim 45, further comprising additional memory means for storing data representing said first image, said control mean comprising means for reading out the stored data to enable said display means to display the first image.

51. The apparatus according to claim 50, wherein said control means comprises shifting means for shifting the junction of the data stored in said memory means and in said additional memory means according to an address of said memory means and an address of said additional memory means.

52. The apparatus according to claim 45, wherein said control means comprises right panorama means for enabling said display means to display both the first and second images so as to form a panorama display in the right direction.

53. The apparatus according to claim 52, wherein said display means comprises a picture frame, and wherein said control means comprises setting means for setting the junction at a position which is right of a centerline of said picture frame.

54. The apparatus according to claim 45, wherein said control means comprises left panorama means for enabling said display means to display first and second images so as to form a panorama display in the leftward direction.

55. The apparatus according to claim 54, wherein said display means comprises a picture frame and wherein said control means comprises setting mean for setting the junction at a position which is left of a centerline of said picture frame.

56. The apparatus according to claim 45, wherein said display means comprise a picture frame and wherein said control means comprises setting means for setting the junction at a predetermined position of said picture frame.

57. The apparatus according to claim 45, wherein said control means comprises means for enabling said display means to display the first and second images so as to form a lateral panorama display.

58. The apparatus according to claim 45, wherein said control means comprises means for enabling said display means to display the first and second images so as to form a longitudinal panorama display.

59. The apparatus according to claim 45, wherein said control means comprises means for enabling said display means to display the first and second images by scrolling.

60. The apparatus according to claim 59, wherein said control means comprises means for enabling said display means to stop scrolling and to display the first and second images as a stationary image.

61. The apparatus according to claim 45, wherein said control means comprises means for enabling said display means to display the first and second images as a stationary image.

62. The apparatus according to claim 45, wherein said control means comprises means for enabling said display means to display the junction in the form of a borderline.

63. The apparatus according to claim 45, wherein said control means comprises means for enabling said display means to display at least two previously photographed images in combination as the first image and stored in said memory means as data in such a manner that the resulting combined image is substantially continuous at said junction formed therefrom.

64. The apparatus according to claim 45, wherein said control mean comprises means for enabling said display means to display the first and second images in a partially overlapped state.

65. The apparatus according to claim 64, wherein said control means comprises means for enabling said display means to change the display according to whether the partially overlapped state is stored.

66. The apparatus according to claim 45, wherein said control means comprises shifting means for shifting the junction in a lateral direction.

67. The apparatus according to claim 46, wherein said control means comprises means for enabling said display means to display only the first image.

68. An apparatus having a display device for a camera, said apparatus comprising
(A) display means for displaying an image;
(B) image generating means for generating an image signal corresponding to a displayed image;
(C) memory means for storing image signals in a frame-by-frame manner; and
(D) control means for causing said display means to simultaneously display at least a portion of a frame of a stored image, and at least a portion of a frame of a subsequently stored image in such a manner that a resulting combined image is substantially continuous at a junction between the images.

69. An apparatus having a display device for a camera, said apparatus comprising:
(A) display means for displaying an image;
(B) image generating means for generating an image signal corresponding to an image;
(C) memory means for storing the image signal as data;
(D) control means for causing said display means to simultaneously display at least a portion of a first image, the portion being derived from said image signal stored in said memory means, and at least portion of a second image corresponding to a real-time image in such a manner that a resulting combined image is substantially continuous at a junction between the images.

70. An apparatus having a display device for a camera, said apparatus comprising:
(A) display means for displaying an image;
(B) memory means for storing data representing a plurality of images which have been already photographed; and
(C) control means for enabling said display means to substantially simultaneously display both a first image and a second image in such a manner that a resulting combined image in such a manner that a resulting combined image is substantially continuous at a junction formed between the first and second images.

* * * * *

UNITED STATES PATENT AND TRADEMARK OFFICE
CERTIFICATE OF CORRECTION

PATENT NO. : 5,138,460
DATED : August 11, 1992
INVENTOR(S) : Akira EGAWA

It is certified that error appears in the above-identified patent and that said Letters Patent is hereby corrected as shown below:

COLUMN 1:

line 24, "end." should read --end,--; and
    line 31, "images" should read --images.--.

COLUMN 9:

line 12, "means" should read --means to--.

COLUMN 10:

line 3, "setting mean" should read --setting means--; and
    line 28, "claim 17," should read --claim 12,--.

COLUMN 11:

line 46, "display mean" should read --display means--.

COLUMN 12:

line 38, "control mean" should read --control means--;
    line 64, "setting mean" should read --setting means--; and
    line 68, "comprise" should read --comprises--.

UNITED STATES PATENT AND TRADEMARK OFFICE
CERTIFICATE OF CORRECTION

PATENT NO. : 5,138,460

DATED : August 11, 1992

INVENTOR(S) : Akira EGAWA

It is certified that error appears in the above-identified patent and that said Letters Patent is hereby corrected as shown below:

COLUMN 13:

line 36, "control mean" should read --control means--.

COLUMN 14:

line 1, "claim 46," should read --claim 45,--;
    line 5, "comprising" should read --comprising:--;
    line 28, "portion" should read --a portion--;
    line 41, "in such a manner that a" should be deleted; and
    line 42, "resulting combined image" should be deleted.

Signed and Sealed this

Fifth Day of October, 1993

Attest:

BRUCE LEHMAN

*Attesting Officer*  *Commissioner of Patents and Trademarks*